United States Patent [19]

Eger

[11] Patent Number: 4,657,301
[45] Date of Patent: Apr. 14, 1987

[54] VEHICLE BODY SUPPORT STRUCTURE

[75] Inventor: Georg Eger, Hochdorf, Fed. Rep. of Germany

[73] Assignee: Dr. Ing. H.c.F. Porsche Aktiengesellschaft, Fed. Rep. of Germany

[21] Appl. No.: 788,583

[22] Filed: Oct. 17, 1985

[30] Foreign Application Priority Data

Oct. 17, 1984 [DE] Fed. Rep. of Germany ....... 3438012

[51] Int. Cl.$^4$ .............................................. B62D 31/00
[52] U.S. Cl. .................................... 296/188; 296/194; 296/198
[58] Field of Search ............... 296/198, 194, 188, 187, 296/185; 280/788

[56] References Cited

U.S. PATENT DOCUMENTS

| | | | |
|---|---|---|---|
| 3,093,392 | 6/1963 | Barenyi | 296/198 |
| 4,183,574 | 1/1980 | Klie et al. | 296/198 |
| 4,449,749 | 5/1984 | Eger | 296/198 |
| 4,466,653 | 8/1984 | Harasaki | 296/194 |
| 4,469,368 | 9/1984 | Eger | 296/194 |
| 4,485,884 | 4/1984 | Fukunaga | 296/198 |

Primary Examiner—Robert R. Song
Attorney, Agent, or Firm—Barnes & Thornburg

[57] ABSTRACT

A reinforced support member structure for a front part of a motor vehicle is described which, in a wall of the wheel housing of the motor vehicle body, has an opening for cooling air. This wall of the wheel housing is delimited by an upper and a lower side bearer member, in which case the members are connected with a floor, a transverse wall as well as a front bearer cross member. They form a spatial frame system at which a wheel guiding member, in particular a lower wishbone, is held in a supported manner. The lower side bearer member of the floor, in the corner area of the opening for cooling air, is supplemented by a reinforcing unit which connects to the transverse wall and the wall of the wheel housing. It includes support sections that are combined into a structural unit, said support sections forming a U-profile-shaped rigid swinging arm receiving means.

16 Claims, 9 Drawing Figures

VEHICLE BODY SUPPORT STRUCTURE

BACKGROUND AND SUMMARY OF THE INVENTION

This invention relates to a reinforced support member structure for the front part of a motor vehicle in the area of the wheel housing. More specifically, the present invention relates to an improved structural support for a movable wheel guiding member in a vehicle of the type having a laterally outwardly facing cooling air opening adjacent the wheel housing.

In the case of a known construction for the support of a wheel suspension guide member disclosed in U.S. Pat. No. 2,841,439, a bearing block is provided on the outside at a cross member of a body structure of a motor vehicle. This bearing block supports itself at two walls of the body that are arranged at an angle to one another and form a rigid edge bond. This type of support is only possible when sufficient space is available and therefore favorable conditions exist in the area of the connecting points of the wheel guiding members. However, in the case of a vehicle where the body structure does not have such a rigid edge bond formed by the walls of the body and where, because of an opening for cooling air in a side wall of the wheel housing in the area of the connecting points of the wheel suspension, the body is relatively soft. Accordingly, corresponding measures must be taken at the body for the optimal absorption of loads.

It is an objective of the invention to provide a reinforced support member structure in the area of an opening for cooling air which can be built without much costly construction, is light in weight and absorbs occurring horizontal and vertical loads while functioning properly in introducing these forces into the wheel housing as well as into the side members and the cross members in a positive manner in such a way that an unchanged position of the wheel guide member connecting points is ensured.

According to the invention, this objective is achieved by supplementing the vehicle body support members in the area of the wheel housing adjacent the cooling air opening with a U-shaped profile reinforcing unit for pivotally supporting the end of the wheel guide member. In preferred embodiments the reinforcing unit is welded to the vehicle cross members, lower side members and wheel housing side wall members.

Principal advantages achieved by means of the invention are that a soft area of the body is reinforced by simple means in such a way that a relatively rigid bond exists for the coupling of a wheel guiding member. The bond is designed so that a flow of force takes place into the vehicle body walls as well as the vehicle body support members so that the forces coming from the wheel can be well absorbed. It is also an advantage of the invention that the reinforcing unit is integrated into the support system so that protruding parts, bearing blocks, etc. are avoided and the bearing points of the wheel suspension are embedded into the body structure so that the forces without any significant formation of moment can be introduced directly into the body.

Further objects, features, and advantages of the present invention will become more apparent from the following description when taken with the accompanying drawings which show, for purposes of illustration only, an embodiment/several embodiments in accordance with the present invention.

DETAILED DESCRIPTION OF THE DRAWINGS

Figure 1:
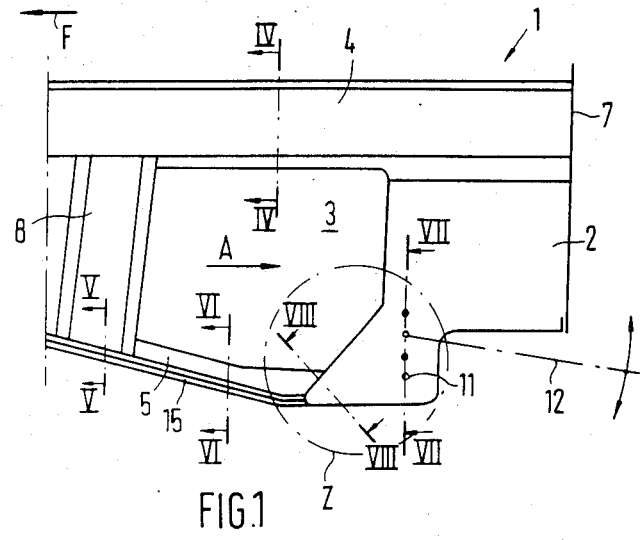
FIG. 1 is a diagrammatic partial side view of a front part of a motor vehicle constructed in accordance with a preferred embodiment of the invention.
Figure 2:
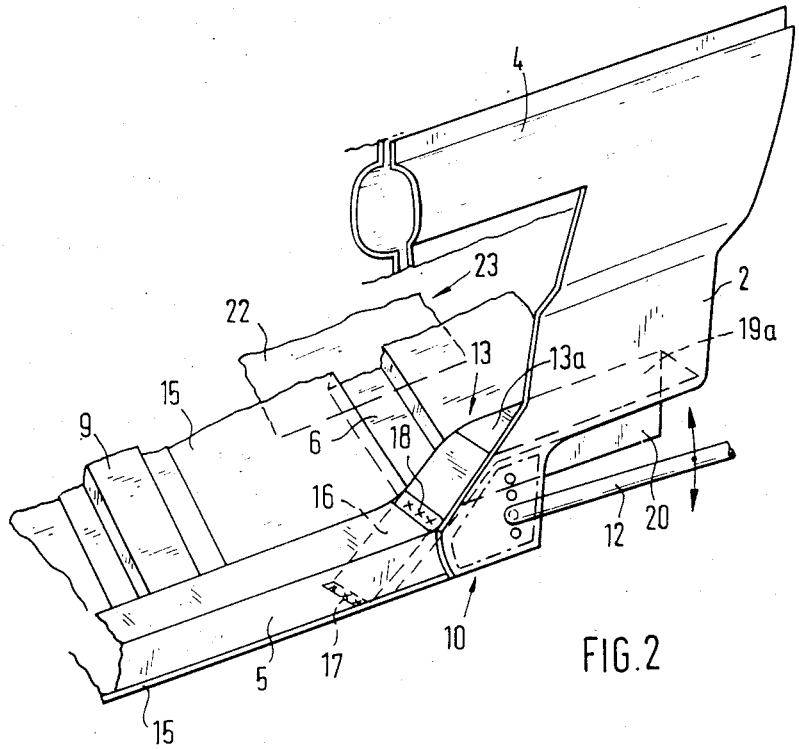
FIG. 2 is a schematic enlarged oblique of the front part of the vehicle of FIG. 1, taken in the general direction of the Arrow A of FIG. 1.
Figure 3:
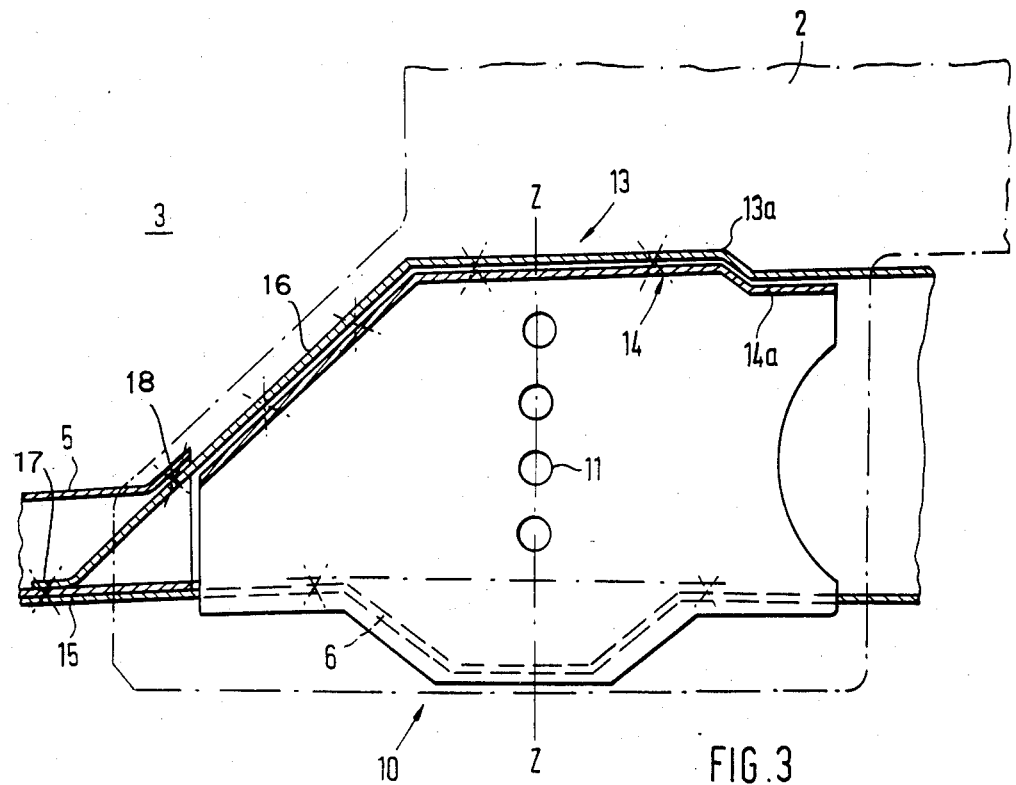
FIG. 3 is an enlarged representation of the detail Z according to FIG. 1 in the section along Line III—III of FIG. 9.
Figure 4:
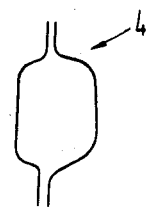
FIG. 4 is a sectional view through an upper side member, taken along Line IV—IV of FIG. 1.
Figure 5:
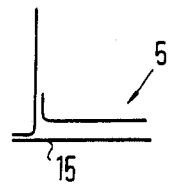
FIG. 5 is a sectional view through a lower side member, taken along Line V—V of FIG. 1.
Figure 6:
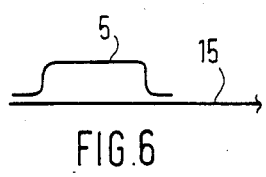
FIG. 6 is a sectional view through the lower side member in the area of the opening for cooling air, taken along Line VI—VI of FIG. 1.
Figure 7:
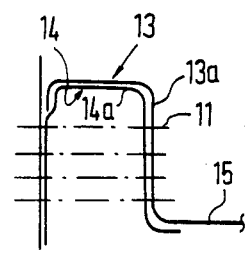
FIG. 7 is a sectional view through the bearing block having the reinforcing part, taken along Line VII—VII of FIG. 1.

FIG. 1 shows a part of a front part 1 of a motor vehicle which in a side wall 2 has one opening 3 for cooling air respectively. This opening 3 is delimited by an upper side bearer member 4 and a lower side bearer member 5, which in connection with a cross bearer member 6 (FIGS. 2 and 3) as well as a transverse or cross wall 7 and a vertical bearer member 8 as well as another cross bearer member 9 form a frame system. Into this frame system, a reinforcing unit 10 is integrated which is formed as a receiving means with bores 11 for pivotally supporting a wheel guiding member 12.

The reinforcing unit 10 is provided in the lower corner area of the opening 3 for the cooling air at the rear end of the lower side bearer member 5. It comprises a bearing block 13 in which a fitted reinforcing part 14 is held. The cross bearer member 6 is connected with the bearing block 13, this cross member 6 being part of a vehicle floor end plate 15 and being also held at the transverse wall 7 of the body 1. It is to be understood that only the edge of the transverse wall 7 is depicted in FIG. 1, this wall 7 extending transversely of the vehicle and forming a connection for the rear end of the leg 19a, wall 20 of reinforcing unit 10.

The bearing block 13 and the interior reinforcing part 14 are preferably designed in the shape of a U-profile and, for receiving the swivelling wheel guide arm 12, are open toward the rear with respect to the driving direction F.

Figure 8:
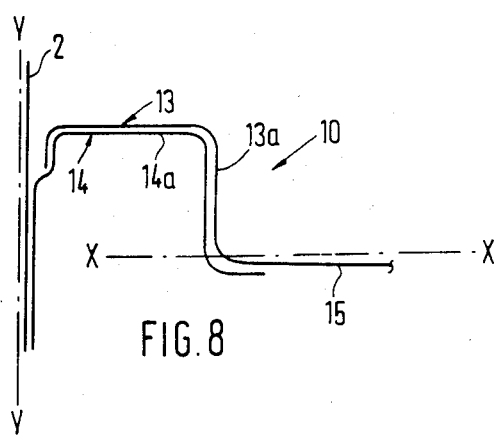
FIG. 8 is a sectional view taken along Line VIII—VIII of FIG. 1 in the area of the connecting point of the lower side member and the bearing block.

The bearing block 13 is provided as an extension of the lower side bearer member 5, projects upward beyond its horizontal plane and forms an exterior support section 13a. This support section 13a, in a horizontal plane X—X, is connected with the floor end plate and forms one piece with it. In a vertical plane Y—Y, the exterior support section 13a is connected with the wall 2 of the wheel housing (FIG. 8).

Figure 9:
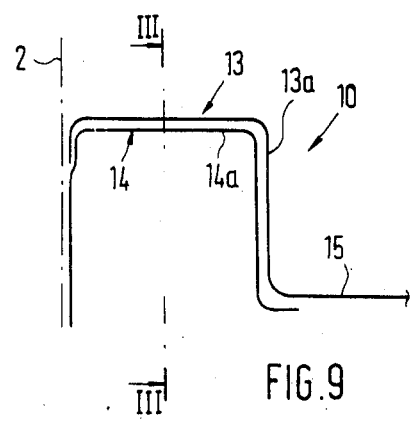
FIG. 9 is a sectional view through the bearing block and the reinforcing unit.

The bearing block 13 has approximately the shape of a triangle in lateral view at its front end and forms a profile that is open in the direction of the exterior rear side of the vehicle. By means of its one leg 16 (FIGS. 2 and 3) extending diagonally toward the front in longitudinal direction of the vehicle, the bearing block 13 is continued under the lower side bearer member 5 and at the end side is connected with the floor end plate 15 (at 17). A further connection 18 for leg 16 takes place with the web 19 of the side bearer member 5. The other leg 19a pointing to the other side and extending horizontally is connected with the wall 2 of the wheel housing which closes off the profile toward the outside, as shown in detail in FIGS. 2 and 9.

The vertical interior wall 20 of the bearing block 13 extending in longitudinal direction up to the transverse wall 7 and is firmly connected with it.

The reinforcing part 14 is fixed in the bearing block 13 by means of weld points. It is preferably designed as a U-profile and is connected with the side wall 2 and forms a second interior support section 14a.

The bearing block 13 is preferably arranged in such a way that it is located approximately in the vertical longitudinal central plane Z—Z of the cross member 6. The receiving bores 11 for the wheel guiding member 12 are provided directly in this vertical plane Z—Z.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A reinforced support structure for supporting an end of a movable wheel guide member in a motor vehicle of the type having a cooling air opening through a vehicle wall panel in the area of a wheel housing, said structure comprising a reinforcing unit disposed adjacent the cooling air opening arranged in the area of the wheel housing for pivotally supporting an end of said movable wheel guide member, said reinforcing unit including support sections forming a U-profile shaped rigid receiving means for said end of the wheel guide member.

2. A structure according to claim 1, wherein said reinforcing unit is disposed adjacent a lower corner area of the cooling opening.

3. A structure according to claim 2, wherein said reinforcing unit connects a lower side bearer member of a vehicle floor with a vehicle wheel housing wall.

4. A structure according to claim 3, wherein the reinforcing unit comprises a part of a floor end plate that is developed as a cross member, said part being connected with the lower side bearer member and the transverse wall of the vehicle body.

5. A structure according to claim 4, wherein as an extension of the lower side bearer member, a bearing block projecting upward is held in the area of the cross member, said bearing block being connected in a horizontal plane being connected with the floor end plate and in a vertical plane with the wall of the wheel housing and forming an exterior part of the guide member receiving means.

6. A structure according to claim 3, wherein the U-profile shaped receiving means exhibits an approximately triangular shape and forms a profile that is open in a rearward direction, said profile, with its one leg extending diagonally toward the front in the longitudinal direction of the vehicle, being guided under the lower side bearer member and at the end side being connected with the floor end plate as well as with a web of the side bearer member, the other leg that faces away and extends horizontally being held in a supported manner at the transverse wall of the wheel housing.

7. A structure according to claim 6, wherein the U-profile shaped receiving means is closed off toward the outside by the wheel housing wall that extends down to the lower side bearer member and forms one of the support sections.

8. A structure according to claim 6, wherein as a further support section, a U-profile shaped reinforcing part is fitted into the U-profile shaped receiving means, said reinforcing part forming an interior part of the receiving means for the wheel guide member and being connected with the support section, the wheel housing wall and the floor end plate.

9. A structure according to claim 7, wherein as a further support section, a U-profile shaped reinforcing part is fitted into the U-profile shaped receiving means, said reinforcing part forming an interior part of the receiving means for the wheel guide member and being connected with the support section, the wheel housing wall and the floor end plate.

10. A structure according to claim 6, wherein the cross member of the floor end plate which in its cross section is developed in the shape of a U-profile is closed off via a cover plate and forms a hollow member.

11. A structure according to claim 8, wherein the cross bearer member of the floor end plate which in its cross section is developed in the shape of a U-profile is closed off via a cover plate and forms a hollow member.

12. A structure according to claim 8, wherein approximately in the vertical longitudinal central plane of the cross member, the U-profile shaped receiving means is provided with the reinforcing part as well as receiving bores for the end of the wheel guide member that are arranged on top of one another are provided.

13. A structure according to claim 11, wherein approximately in the vertical longitudinal central plane of the cross member, the U-profile shaped receiving means is provided with the reinforcing part as well as receiving bores for the end of the wheel guide member that are arranged on top of one another are provided.

14. A structure according to claim 1, further comprising a wheel guiding member pivotally supported in the U-profile shaped receiving means.

15. A structure according to claim 14, wherein the wheel guiding member extends in the vehicle rearward direction away from the pivotal connection at the U-profile shaped rigid receiving means.

16. A structure according to claim 15, wherein the cooling air opening is immediately adjacent and forward of the reinforcing unit.

* * * * *